United States Patent [19]

Shimada et al.

[11] 4,349,177
[45] Sep. 14, 1982

[54] PUSH-BUTTON TYPE VALVE

[75] Inventors: Yukio Shimada; Naoyoshi Suzuki; Toshio Ohashi, all of Yokohama; Yasushi Inoshita, Tokyo, all of Japan

[73] Assignee: Nissan Motor Co., Ltd., Yokohama, Japan

[21] Appl. No.: 185,642

[22] Filed: Sep. 9, 1980

[30] Foreign Application Priority Data

Sep. 11, 1979 [JP] Japan .................... 54-125300[U]

[51] Int. Cl.³ .............................................. F16K 31/44
[52] U.S. Cl. .............................. 251/230; 137/624.13; 137/625.69
[58] Field of Search ................... 251/230; 137/624.13, 137/625.69; 74/56, 57

[56] References Cited

U.S. PATENT DOCUMENTS

| | | | |
|---|---|---|---|
| 3,566,705 | 3/1971 | Frydman | 74/107 |
| 4,116,216 | 9/1976 | Rosenberg | 137/624.13 |
| 4,221,236 | 9/1980 | Rosenberg | 137/624.11 |
| 4,221,238 | 9/1980 | Madsen | 251/230 X |
| 4,262,879 | 4/1981 | Gonner | 251/230 |

FOREIGN PATENT DOCUMENTS 108678  6/1899  Fed. Rep. of Germany.
1155487  5/1956  France.

Primary Examiner—A. Michael Chambers
Attorney, Agent, or Firm—Thompson, Birch, Gauthier & Samuels

[57] ABSTRACT

The present invention relates to a two position valve having a cam and a cam follower mechanism for holding the valve element in either of its two operative positions, depending on the operation of a push button switch arrangement cooperating with the valve so that the valve shifts between positions in response to pushing the switch. The cam takes the form of an arrowhead shaped groove having first and second apex portions in which the cam follower, a spring loaded pin, traces. The groove is formed with a step at one apex to prevent the pin from reversing its trace and to ensure its oneway tracing about the groove.

6 Claims, 7 Drawing Figures

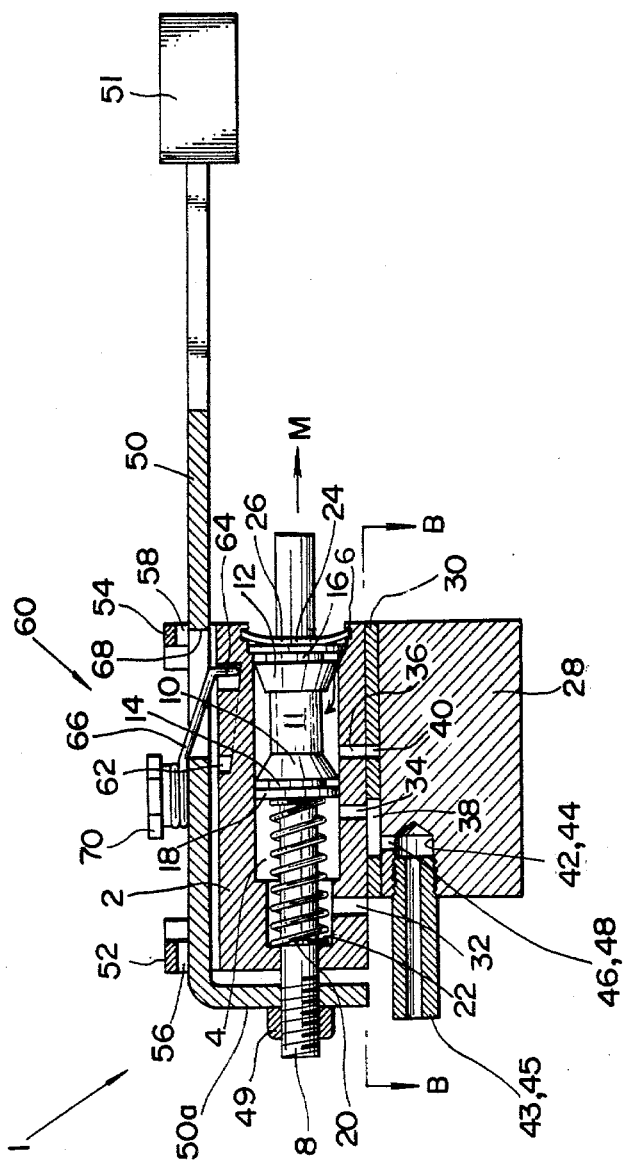

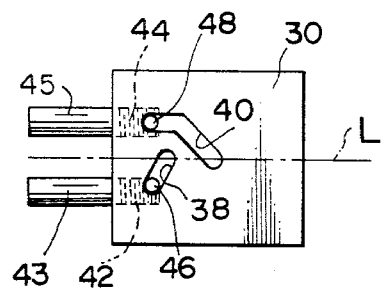
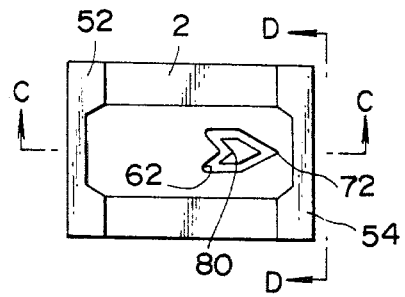
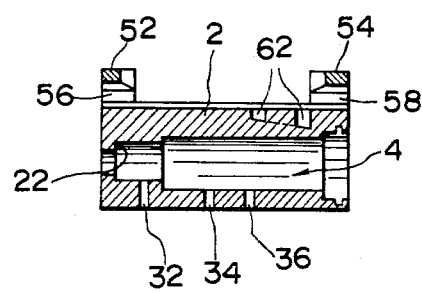
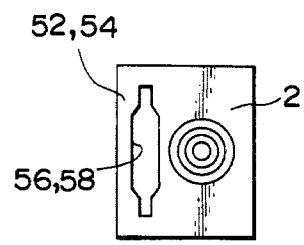
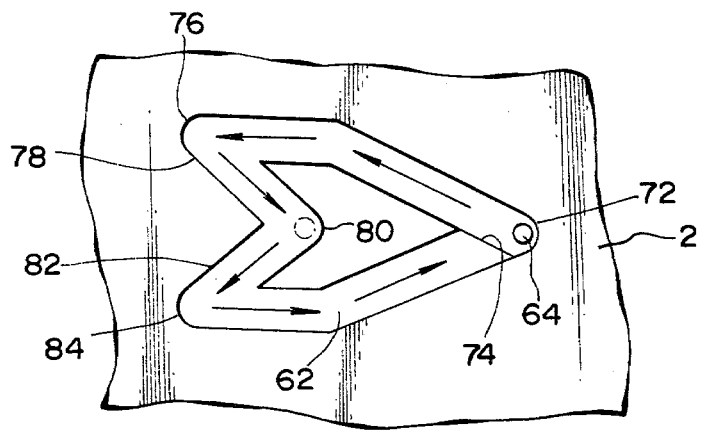

PUSH-BUTTON TYPE VALVE

BACKGROUND OF THE INVENTION

1. Field of the Invention

The present invention relates generally to valves and more particularly to a valve which has a mechanical push button control and which eliminates the need for complex and expensive solenoids and relays.

2. Description of the Prior Art

In a known arrangement, a two position valve has been provided with a solenoid and a push button remote control switch for controlling the arrangement. However, this arrangement has suffered from the drawbacks of being complex (and therefore expensive), bulky and prone to occasional failure.

SUMMARY OF THE INVENTION

The present invention features a two position valve having an "on" position and an "off" position, and having a cam and cam follower arrangement which holds the valve element in either the "on" or "off" position, depending on the selective operation of a push button lever operatively connected to the valve element. The cam takes the form (in the preferred embodiment) of an arrowhead shaped continuous groove formed in the valve body while the cam follower takes the form of a spring loaded pin carried on the lever which traces the groove. The groove is formed with a step immediately adjacent the pointed end apex of the groove and further formed with an indent at the blunt end of the groove which defines a second apex. The apexes define seats for retaining the pin while the valve element is held in one of its two positions, and the step prevents the pin from reversing its trace direction.

BRIEF DESCRIPTION OF THE DRAWINGS

The features and advantages of the valve according to the present invention will be more clearly appreciated from the following description taken in conjunction with the accompanying drawings in which like reference numerals designate corresponding elements, and in which

FIG. 2 is a sectional view taken along section line A—A of FIG. 1;

FIG. 3 is a sectional view taken along section line B—B of FIG. 2;

FIG. 4 is a plan view of the valve body of the present invention;

FIG. 5, is a sectional view taken along section line C—C of FIG. 4;

FIG. 6 is a side elevation taken along line D—D of FIG. 4; and

FIG. 7 is an enlarged view of the cam groove according to the present invention.

DETAILED DESCRIPTION OF THE PREFERRED EMBODIMENT

Figure 1:
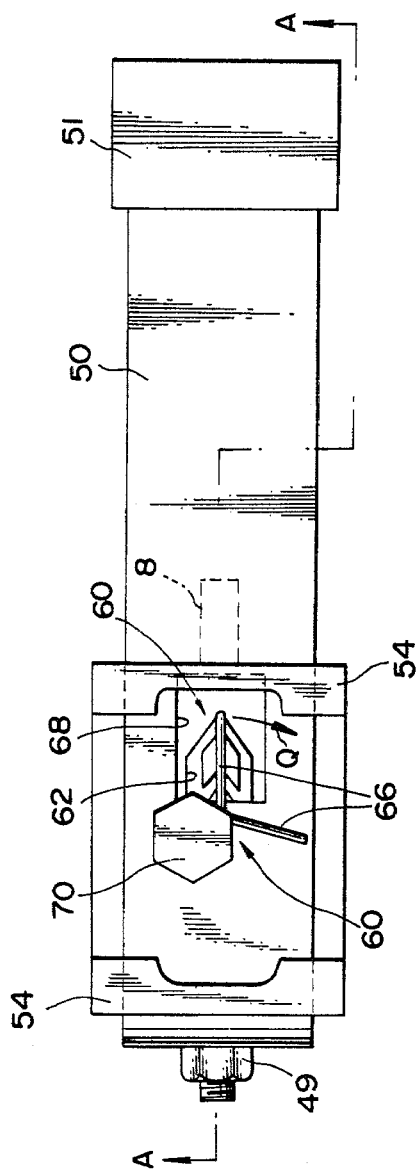
FIG. 1 is a plan view of present invention.

Turning now to the drawings and more specifically to FIGS. 1 and 2, a preferred embodiment of the valve of the present invention is shown generally denoted by the numeral 1. As best shown in FIG. 2, the valve 1 comprises a valve body 2, formed with a stepped through bore 4, in which a valve element generally denoted by the numeral 6, is disposed. The valve element includes a shaft 8 which carries thereon a pair of spaced sealing bodies 10 and 12, separated by a spacer 11. Alternatively, the sealing body-spacer-sealing body arrangement may be integrally formed for simplicity of installation. These bodies 10 and 12 are formed of a resilient material to serve as the lands of the valve element 6 and are interposed between spacers 14 and 16. The spacer 16 is fixed to the shaft 8 while the sealing bodies 10, 12, spacer 14 and a movable spool guide 18 are, one by one, slid into place on the shaft 8. A spring (coil) 20 is disposed about the shaft 8 so that one end abuts the movable spool guide 18 at one end and a shoulder 22 of the stepped bore 4 at the other. One end of the stepped bore 4 is closed by a stationary spool guide 24 which is held in place by a snap fastener 26.

The valve body 2 is mounted to a base member 28, and a gasket 30 is sealingly sandwiched between the valve body and the base member. The valve body 2 is formed with a bore 32 which serves as an atmospheric port and with bores 34, 36 which fluidly communicate with angled slots 38 and 40 (best shown in FIG. 3) formed in the gasket 30. The base member 28 is formed with a pair of threaded bores 42 and 44 and bores 46 and 48 which lead from the bores 42 and 44 to respectively communicate with the slots 38 and 40. Connector nipples 43 and 45 are threaded into respective bores 42 and 44.

One end of the shaft 8 is threaded and detachably fixed to a downwardly depending portion 50a of a sliding arm 50 by a nut 49. A button 51 is provided at the other end of the arm 50 and adapted for pressing by an operator. The strength of the spring 20 is of course selected with this in mind.

The valve body 2 is formed with slotted bridge portions 52 and 54 having respective slot shaped apertures 56, 58 through which the sliding arm 50 is slidably supported. With the arrangement shown, the arm is initially inserted through the bridges and then fitted with the button 51. Attachment of the nut 49 then establishes an operative connection between the arm and the valve element.

A cam and cam follower mechanism generally indicated by the numeral 60 is provided to hold the valve element in either a first position wherein (as illustrated in FIG. 2) the bore (atmospheric port) 32 and the bore 34 are in fluid communication, and the bore 36 is isolated by the sealing bodies 10 and 12, or in a second position wherein the bores 34 and 36 are in fluid communication, and the atmospheric port defining bore 32 is isolated therefrom. This cam and cam follower device takes the form (in the preferred embodiment) of a cam groove 62 having a substantially arrowhead configuration and a pin 64 defined at the end of a spring 66.

As best shown in FIG. 1, the sliding arm 50 is formed with an aperture or window 68 which allows the spring 66 to be mounted on top of the arm by a shouldered screw 70. One arm of the spring 66 is arranged to fit into a hole in the sliding arm 50 to enable the spring to apply a slight bias on the pin 64 which tends to urge the pin across the face of the cam (cam groove) in a clockwise direction, indicated by the arrow Q shown in FIG. 1.

The cam groove has a gradually varying depth which is deepest at the pointed end apex 72 and gradually becomes shallower to define a step 74 immediately adjacent the apex. The variation in the depth in the cam groove is best shown in the sectional views of FIGS. 1 and 5.

The valve (coil) spring 20 constantly urges the valve element 6 toward its position shown (to the right in the drawings). It should be noted that the effect of the spring 20 also will urge the sliding arm 50 and the cam pin 64 to the left in the drawings, into either of the apexes 72 or 80.

In operation, taking the initial position as that shown in FIGS. 1 and 2, the cam pin 64 rests in the pointed end apex 72, shown in FIG. 7. As the button 51 is pressed, the pin 64 will trace along the cam groove as shown by the arrows, toward a first recess 76. The movement from the apex 72 to the recess 76 defines the maximum travel of the button 51. The spring 66 constantly urges the cam pin 64 in a clockwise direction, as shown in the drawings, so that upon relaxation of the force on the button, the valve coil spring 20 causes the pin to slide along the first arm 78 of an indent formed at the blunt end of the arrowhead and to seat in the second apex 80, as shown in phantom in FIG. 7. In this position, the valve element is held in its second position to allow exclusive communication between the ports 34 and 36.

Upon depressing the button 51, the constant force of the spring 66 causes the pin to move from the second apex 80 to trace along a second arm 82 of the indent toward a second recess 84. Upon subsequent release of the button 51, the spring 20 will drive the operatively connected valve element, and arm 50 in the direction indicated by the arrow M in FIG. 2, to cause the pin 64 to trace the cam groove from the second recess 84 to the first apex 72.

Upon reaching the apex 72 the pin will drop down the step 74 and thus be prevented from tracing backwardly along the cam path between the apex 72 and the recess 84 which might otherwise occur due to the slight bias applied to the pin 64 by the spring 66. Those skilled in the art will readily appreciate that the forces of the springs 20 and 66 oppose each other, in that the bias force of the cam follower spring 66 will urge the pin 64 to "climb" the second arm 82 from the second apex 80, if not opposed by the valve coil spring 20. At the same time, the cam follower spring 66 must be capable of shifting the pin 64 well into the second recess 84 so that the pin will not trace backwardly toward the second recess when the force on the button is released, while the force of the valve coil spring 20 must be small enough to be easily overcome by a light push by an index finger.

It should be noted however, that the present invention is not limited to a continuous groove design, but may take the form of a single groove.

The valve of the present invention finds utility in a control system for automotive air conditioners, but obviously is not limited in any way to such a purpose and may be used in any fluid control system to replace an electrical switch and solenoid controlled fluid valve combination.

The simple design permits very easy production and assembly as well as ensuring a long and efficient working life.

In summary, the present invention features a two position fluid valve which is retained in either of its two operative positions by the combination of an arrowhead shaped cam and cam follower mechanism and a valve spring urging the cam follower into either of two pin retaining apexes formed in the arrowhead cam. Pressing a button to overcome the valve spring force causes the cam follower to trace a path within the arrowhead cam between the two apexes which correspond to shifting the valve between its two operative positions.

What is claimed is:

1. A valve comprising:
   a valve body component;
   a valve member movably retained in said valve body component and having first and second operative positions;
   a first spring for biasing said valve member towards one of said operative positions;
   an arm component operatively connected to said valve member;
   a groove formed in one of said components, which groove has first and second seat portions and a substantially arrow head shape which defines said first seat portion at the sharp end thereof and said second seat portion at an apex defined by an indent at the blunt end thereof; and
   a second spring carried by the other of said components and having a pin formed integrally at one end thereof, which pin is adapted to trace in said groove and to seat in said first and second seat portions to hold said valve member in said first and second operative positions respectively, said second spring being adapted to bias said pin into and across the face of said groove so that said pin traces in said groove in one direction.

2. A valve as claimed in claim 1, wherein said groove is continuous and has a varying depth which defines a step therein to prevent said pin from reversing its tracing direction.

3. A valve as claimed in claim 1, wherein said valve body component has first and second slotted bridge portions formed thereon, which slotted bridge portions slidably receive said arm component for guiding said arm component when it is moved to move said valve member between said first and second operative positions.

4. A valve comprising:
   a valve body;
   means defining a stepped through bore in said valve body;
   means defining a first port in said valve body which first port communicates with said bore;
   means defining a second port in said valve body which second port communicates with said bore;
   a shaft extending coaxially through said stepped through bore, said shaft having spaced first and second sealing bodies fixedly mounted thereon which sealing bodies sealingly contact a wall of said bore;
   a spring disposed about said shaft and adapted to engage a shoulder of said bore and one of said first and second sealing members;
   first and second slotted bridge portions formed on a side of said valve body;
   an arm slidingly mounted through said slotted bridge portions, said arm having an end portion deflected at an angle with respect to the remainder of said arm, the deflected portion being detachably fixed to an end of said shaft which protrudes out of said bore;
   a substantially arrow shaped cam groove formed in said side of said valve body, said groove having a varying depth which defines a step therein;
   means defining a window in said arm;
   a pin formed on one end of a spring mounted on said arm, said spring being adapted to extend through said window, with said pin being slidably engaged in and biased across the face of said groove, said sealing bodies being movable to a first and second operative position controlling communication between said first and second ports in response to movement of said arm, said pin being adapted to trace in said groove and seat in first and second seat portions to hold said valve member in said first and second operative positions, respectively.

5. A valve as claimed in claim 4, wherein said spring is mounted on said sliding arm by a shoulder screw.

6. A valve comprising:
a valve body component having first and second slotted bridge portions formed thereon;
a valve member movably retained in said valve body component and having first and second operative positions;
an arm component slidably received in said first and second slotted bridge portions, said arm component being operatively connected to said valve member;
a groove formed in said valve body component between said first and second bridge portions, which groove has first and second seat portions and a substantially arrow head shape which defines said first seat portion at the sharp end thereof and said second seat portion at an apex defined by an indent at the blunt end thereof; and
a spring carried by and protruding through a window in said arm component, said spring having a pin formed integrally at one end thereof, which pin is adapted to trace in said groove and to seat in said first and second seat portions to hold said valve member in said first and second operative positions respectively,
said spring being adapted to bias said pin into and across the face of said groove so that said pin traces in said groove in one direction.

* * * * *